United States Patent

[11] 3,568,819

| [72] | Inventor | William W. Mann |
| | | Talmage, Pa. |
| [21] | Appl. No. | 801,632 |
| [22] | Filed | Feb. 24, 1969 |
| [45] | Patented | Mar. 9, 1971 |
| [73] | Assignee | Sperry Rand Corporation |
| | | New Holland, Pa. |

[54] MOUNTING AND DRIVE FOR A HORIZONTALLY AND VERTICALLY SWINGABLE UNLOADING FEED CONVEYOR
1 Claim, 7 Drawing Figs.

[52] U.S. Cl. .................................................. 198/45, 198/98, 198/99, 214/521
[51] Int. Cl. ..................................................B65g 47/58, B60p 1/40
[50] Field of Search........................................ 214/17, 519—522; 198/97—100, 119, 88, 45

[56] References Cited
UNITED STATES PATENTS
| 1,067,450 | 7/1913 | Welch .......................... | 198/119 |
| 3,347,350 | 10/1967 | Lindstrom et al............ | 214/521X |

*Primary Examiner*—Robert G. Sheridan
*Attorneys*—Joseph A. Brown, John C. Thompson, James J. Kennedy and George C. Bower ABSTRACT: A feed-unloading mechanism from a mixing and storage tank comprises a vertically inclined lift auger conveyor receiving feed from a mixing and storage tank and having a discharge head directing the upwardly conveyed feed downwardly through a pivotally mounted chute. The chute directs the feed into a generally horizontal unloading auger conveyor pivotally mounted to swing horizontally and vertically through wide arcs while the unloading feed auger is driven by a bevel gear drive comprising two small bevel gears and a larger intermediate bevel drive gear.

INVENTOR.
WILLIAM W MANN

PATENTED MAR 9 1971
3,568,819
SHEET 2 OF 2
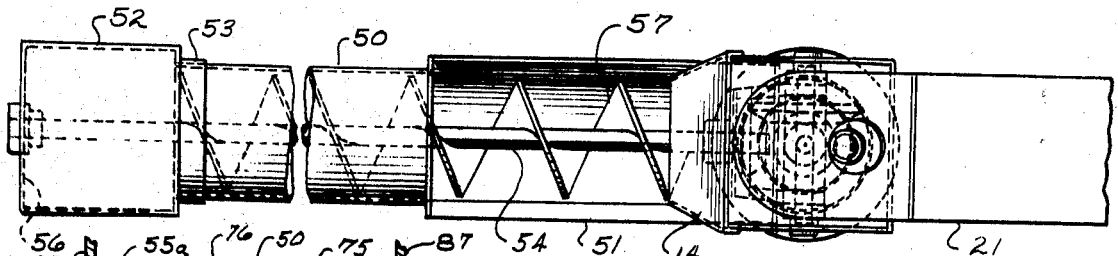
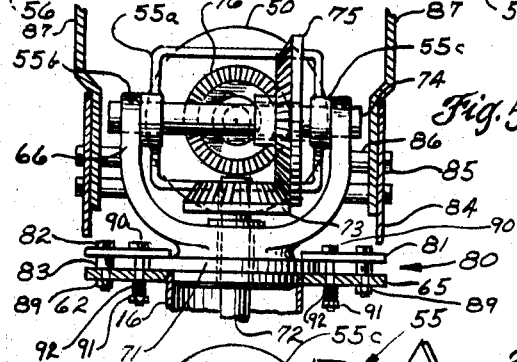
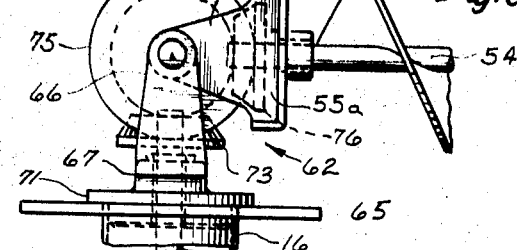
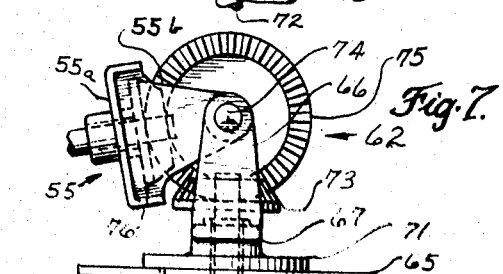
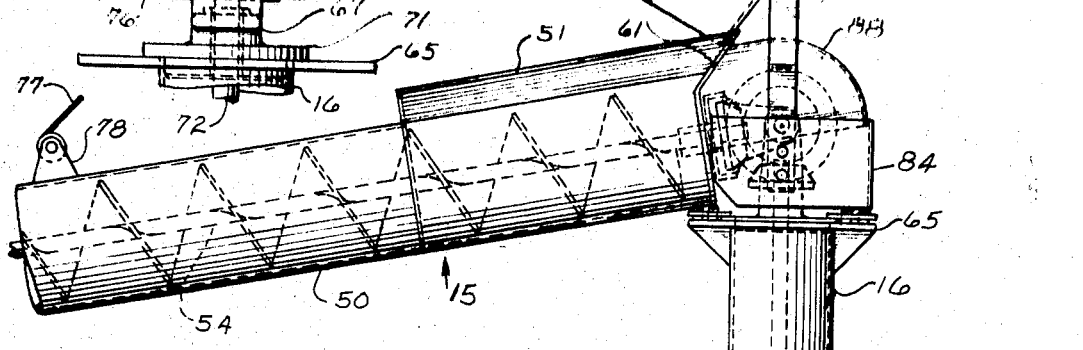
INVENTOR.
WILLIAM W MANN
BY
ATTORNEY

MOUNTING AND DRIVE FOR A HORIZONTALLY AND VERTICALLY SWINGABLE UNLOADING FEED CONVEYOR

BACKGROUND OF THE INVENTION

This invention relates to feed discharge means for a grinder mixer and is directed particularly to the means for mounting and driving the unloading conveyor of a feed discharge means.

In grinder mixers, feed material is ground and conveyed to a tank where it is mixed with other feeds or supplements and stored. The grinder and tank are mounted on a wheeled frame for carrying the mixed feed to cattle, hogs and other animals or to storage bins. Feed discharge means are provided on the grinder mixer and comprises a lift discharge conveyor and an unloading conveyor. The unloading conveyor is pivotally mounted on the frame to deliver the feed over an area. The lift discharge conveyor receives the feed mixer from the bottom portion of the tank and lifts it to drop the feed into the intake of the lift conveyor.

The locations of troughs, bins, feed tanks and the like are quite varied in heights and accessibility from the portable tank. The troughs or bins may be behind fences or in raised or depressed structures making it difficult to properly position the unloading conveyor for discharge. Also, it may be desirable to spread the feed on the ground or along a trough. Thus it is desirable that the unloading conveyor be able to assume a wide range of unloading positions.

In previous grinder mixers the unloading conveyor was mounted on the wheeled frame adjacent to the ground. The horizontal and vertical movement of the unloading conveyor was limited and the unloading conveyor could not be depressed below a horizontal position.

It is therefore, the purpose of this invention to provide a feed discharge means that permits the unloading conveyor to deliver feed over a wide range of vertical and horizontal axes and at an angle below the horizontal.

OBJECTS AND SUMMARY OF THE INVENTION

An object of this invention is to provide a feed discharge means on a grinder mixer with a storage tank that unloads over wider vertical and horizontal axis and maybe tilted below a horizontal position.

Another object of this invention is to provide chute means that follows the positions of the unloading conveyor while maintaining registry with the discharge from lift discharge conveyor.

Another object of this invention is to increase the maneuverability and range of discharge positions of the unloading conveyor without a complicated drive mechanism.

Another object of this invention is to provide a mounting for a chute to guide feed into the unloading conveyor that is pivotable about the vertical axis of rotation of the unloading conveyor.

In summary this invention comprises means for operating of the unloading conveyor over a wide range of horizontal and vertical positions above and below a horizontal plane and the variably mounting a feed chute in feed-transferring relation with the unloading conveyor over the wide range of horizontal and vertical positions.

These and other objects and advantages of this invention will be apparent from the following description and claims taken in connection with the accompanying drawing which illustrates the various features of this invention.

BRIEF DESCRIPTION OF THE DRAWINGS

FIG. 2 is a top plan view of the feed discharge taken in the direction indicated by lines 2–2 of FIG. 1 with the unloading conveyor shortened and the lift conveyor fragmentarily shown.

FIG. 3 is a plan view fragmentarily illustrating the lift conveyor and the unloading conveyor at a 90° angle to one another.

FIG. 4 is a side elevation view of the feed discharge means with the lift conveyor fragmentarily shown and the unloading conveyor fragmentarily shown tilted below horizontal.

FIG. 5 is a cross-sectional view of the unloading conveyor drive taken along lines 5–5 of FIG. 1.

FIG. 6 is a side view of the unloading conveyor drive of FIG. 5 without the casings or the chute support.

FIG. 7 is a side view of the unloading conveyor drive with the unloading conveyor support yoke tilted below the horizontal.

DETAILED DESCRIPTION OF THE PREFERRED EMBODIMENT

Figure 1:
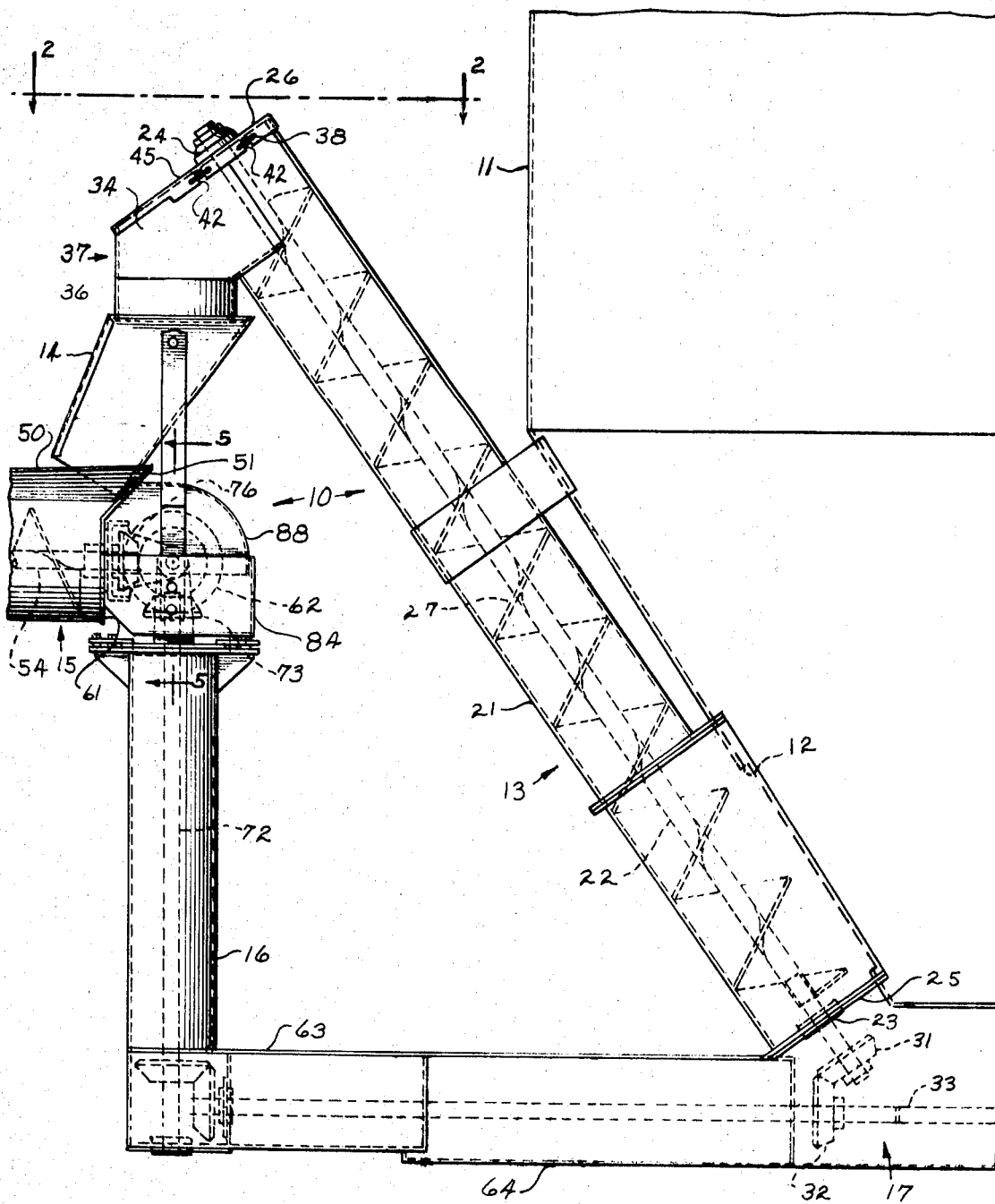
FIG. 1 is a side elevation of the feed discharge means with the unloading conveyor fragmentarily shown.

The feed discharge means 10 shown in FIG. 1 in association with a mixing and storage tank 11 is part of the wheel-mounted grinder mixer for grinding and mixing feed. Feed material such as corn are ground and delivered to the storage tank 11 for mixing with other feeds or supplements and is discharged through the opening 12 in the lower end of the conical portion of the tank to a feed lift conveyor 13. The feed lift conveyor 13 extends upwardly at an angle and carries the feed up for a downward discharge through a chute 14. The chute delivers the feed to the unloading conveyor 15 more fully shown in FIGS. 2 and 4. The unloading conveyor carries the feed to its outer end for discharge.

The unloading conveyor is pivotally supported to the drive shaft casing 16 beneath chute 14 at the feed end and may be positioned in a wide range of angular positions about horizontal and vertical axes with the chute maintaining overlapping relation with the unloading conveyor. The feed lift conveyor and the unloading conveyor are operated by drive means 17 connected to the power takeoff (not shown) of a tractor that pulls the grinder mixer. In FIG. 1 the lift conveyor 13, the unloading conveyor 15, the vertical drive shaft casing 16 are in the same plane and viewed from the side and generally rearwardly of the grinder and mixer.

The lift conveyor 13 comprises casing means 21 extending from the bottom of the mixer and storage tank upwardly at an angle generally parallel to the conical sides of the tank and above the conical portion. The lift conveyor casing is attached to the conical side of the tank. The shaft 22 extends longitudinally through the casing means 21 and is rotatably mounted in bearings 23, 24 at opposite ends. The bearing 23 at the lower end is held by a lower mounting 25 on the casing. The upper bearing 24 is attached to the lift cover 26 at the end of the casing means. The shaft 22 has a single flight auger 27 which carries feed material discharged through the opening 12. The lift shaft and auger are rotated by a lift auger drive bevel gear 31 meshing with the first drive bevel gear 32 of the drive means 17 of the grinder mixer. The auger 27 is rotated so as to lift or carry the mixed feed upwardly.

At the upper end of the lift casing 21 are generally parallel walls 34, 35 and a circular downwardly facing spout 36 forming a lift conveyor discharge head 37. The lift conveyor cover 26 closes the end of the casing means 21 and the top of the parallel walls 34, 35. A flange 38 overlaps with the casing means and the parallel walls. U-shaped slots in the flange pass bolts 43. Helical springs 44 and wing nuts 45 for fastening the cover on the casing means and walls. The springs are between the nuts and the flange and set the amount of pressure applied to the cover flange. In the case of the backing up of feed from the discharge spout, the cover 26 is forced off of the nuts and bolts and the bearing 24 forced off the end of the lift conveyor shaft 22. This opens the end of the casing to discharge feed. Thus the cover and fastening means functions as a safety device to prevent overloading of the lift conveyor.

The unloading conveyor 15 has a cylindrical tubular casing 50 with a feed hopper 51 at one end and unloading head 52 at the other end. The feed hopper 51 is on the upper side of the conveyor and has a greater length than width. The unloading head has a circular collar 53 for fitting the unloading head on the end of the casing. The unloading conveyor has a shaft 54 rotatably mounted in the yoke 55 later described herein and in the wall 56 of the unloading head 52 at the other end. A single flight auger 57 is mounted on the shaft and rotated by unloading conveyor drive means 62 later described herein to force the feed outwardly through the casing to the unloading head. The casing and hopper have a rear wall 61 closing the end of the casing through which the shaft extends.

The unloading conveyor drive 62 is mounted on top of the vertical drive shaft casing 16, which, in turn, is supported on the diagonally extending drive shaft casing 63 mounted on the frame 64 of the grinder mixer. The vertical drive shaft casing 16 has an annular flange 65 extending normally thereto. A yoke 66 has a base 67 fitting in the end of the drive shaft casing 16 with a flange 71 overlapping with the flange 65 of the drive shaft casing. The vertical drive shaft 72 is journaled in the base 67 of the yoke 66 and has fourth bevel drive gear 73 mounted thereon between the arms of the yoke. A stub shaft 74 extends between and is journaled in the ends of the arms of the yoke above the fourth bevel drive gear 73. As intermediate bevel gear 75 is rotatably mounted on the stub shaft 74 in engagement with the fourth bevel drive gear 73.

Also mounted between the arms of the yoke is the unloading conveyor support yoke 55. This yoke comprises a transverse portion 55a parallel to the stub shaft 74 and perpendicular to the unloading conveyor shaft and two arms 55b, 55c perpendicular thereto pivotally mounted on the stub shaft. The unloading conveyor shaft 54 is rotatably mounted in the unloading yoke 55 and has a bevel gear 76 between the arms 55b, 55c meshing with the intermediate gear 75 rotatably mounted on the stub shaft 74. Thus power is transmitted from the vertical drive shaft 72 through the fourth bevel drive gear 73 the intermediate gear 75 to the unloading bevel gear 76.

The unloading yoke 55 is angularly pivotal in relation to the drive bevel gear yoke 66 so that the unloading conveyor can be swung through a vertical angle with the unloading bevel gear remaining in mesh with the intermediate gear for transmission of rotative power. The unloading bevel gear and the fourth bevel drive gear are of approximately the same diameter and are approximately half the diameter of the intermediate gear. This difference in size between the unloading bevel gear and the intermediate gear permits the unloading conveyor to swing through a wide vertical angle arc.

The unloading conveyor is intermediately supported by variable length cable 77 connected to a winch (not shown) on the unloading conveyor through a pulley (not shown) attached to a support arm (not shown) at the top of the mixer tank. The cable 77 and attachment 78 to the unloading conveyor are shown in FIG. 4. Clamping means 80 are mounted on the vertical drive shaft casing flange 65 for slidably holding the flange 71 of the drive bevel gear yoke. The clamping means 80 comprises metal straps 81 with bolts 82 extending through the straps 81, spacers 83 and the flange 65 to thread in nuts 89. The inner bolts 90 extend through the straps 81 and flange 65 for resilient securing by nuts 91 and springs 92. The loading of the springs determines the frictional grip of the clamping means. The bolts 90 are tightened so that the yoke is firmly held but permits the yoke to rotate on the application of a torque as the unloading conveyor is pushed horizontally. The yoke could be rotated 360°. However, the arc of rotation of the unloading conveyor is limited by the other structural elements of the grinder mixer to approximately 270°.

A three-sided shield 84 extends around the lower half of the unloading conveyor drive and has an open side facing the rear end of the unloading conveyor. This shield is attached to the yoke 66 by means of bolts 85 threaded into the spacers 86 on the arms of the yoke. The vertically extending supports 87 for the chute 14 are also mounted on these spacers by the bolts 85 and are positioned between the shield 64 and the spacers 86. An upper cover shield 88 having a curved top and two sides is attached to the rear wall 61 of the unloading conveyor casing and hopper. The upper cover shield moves with the unloading conveyor in overlapping relation with the three-sided shield 84 so as to provide protection from the bevel gear drive.

The straps 87 extend on opposite sides of feed chute 14 and support the chute by pivotal means 95. The top and bottom have openings 96 and 97. The spout 36 is smaller than and extends within the top opening 96 to deliver feed within the chute. The bottom of the chute and the opening 97 overlaps with the hopper 51 to discharge the feed into the hopper. The chute rotates with the yokes 66 and 55 to turn the chute with the unloading conveyor so that the chute and hopper are always in registry. The spout 36 is stationary and the chute rotates around the spout to remain in alignment therewith.

It is thus seen from the foregoing description that the unloading conveyor swings through a wide horizontal arc of 270° and a wide vertical arc from approximately 10° below the horizontal plane to approximately 60° above the horizontal plane. Over these wide arcs the chute remains in position to deliver feed to the hopper of the unloading conveyor. The approximate 10° angle below the horizontal permits the unloading head to project downwardly over fences and be positioned close to the feed bin or trough. This reduces the distance between the trough or bin and the unloading head. A more accurate discharge of the feed is attained and if it is windy less feed is carried away. These advantages are attained without resorting to complicated drives and transmissions.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

I claim:

1. In a feed transfer apparatus having a generally upwardly extending feed conveyor with a feed intake at the lower end and a discharge facing downwardly at the upper end for lifting feed from a lower level to an upper level;

an unloading conveyor having feed-receiving means at one end and a discharge means at the other end and a shaft with an auger for conveying feed from said feed-receiving means to said discharge means;

mounting means at an intermediate level between the lower and upper levels of the upwardly extending feed conveyor including a fixed member, a rotatable member mounted on said fixed member and a power transmitting shaft extending through said members characterized by:

a yoke on said rotatable member and having a stub shaft mounted therein;

a gear drive comprising a driving bevel gear attached to said power-transmitting shaft, a driven bevel gear on said unloading conveyor auger shaft and an intermediate bevel gear mounted on said stub shaft in rotatable relation to said yoke and meshing with said driven and driving gears for transmission of power;

arms attached to said unloading conveyor and pivotally mounted on said stub shaft in rotatable relation to said support member and said intermediate gear over a range of vertical angles including a downward tilt below the horizontal with said gears in mesh over a wide range of horizontal angles;

two vertically extending straps mounted on said yoke on opposite sides thereof; and chute means pivotally mounted on said straps above the horizontal axis and pivoted about the vertical axis in registry with said feed discharge and said feed receiving means over the range of vertical and horizontal movement of said unloading conveyor.